(12) United States Patent
Yamanaka et al.

(10) Patent No.: US 7,389,519 B2
(45) Date of Patent: Jun. 17, 2008

(54) OPTICAL HEAD

(75) Inventors: Kazuhiko Yamanaka, Osaka (JP);
Takuya Okuda, Osaka (JP); Kazutoshi Onozawa, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 489 days.

(21) Appl. No.: 10/870,055

(22) Filed: Jun. 18, 2004

(65) Prior Publication Data

US 2005/0050569 A1 Mar. 3, 2005

(30) Foreign Application Priority Data

Jun. 19, 2003 (JP) ............................. 2003-174348

(51) Int. Cl.
*G11B 7/09* (2006.01)
(52) U.S. Cl. ..................................................... 720/683
(58) Field of Classification Search ................. 720/681, 720/682, 683; 369/44.11, 44.16, 44.21; 359/694, 359/824; 250/252
See application file for complete search history.

(56) References Cited

U.S. PATENT DOCUMENTS

| | | | | | |
|---|---|---|---|---|---|
| 4,386,823 | A | * | 6/1983 | Musha | 369/44.11 |
| 4,479,051 | A | * | 10/1984 | Musha | 250/202 |
| 5,615,203 | A | * | 3/1997 | Fukakusa | 720/682 |
| 7,113,351 | B2 | * | 9/2006 | Hovanky | 359/824 |
| 2003/0198149 | A1 | * | 10/2003 | Kuwayama et al. | 369/44.21 |
| 2004/0174614 | A1 | * | 9/2004 | Hovanky | 359/694 |
| 2004/0223423 | A1 | * | 11/2004 | Tsuda | 369/44.16 |

FOREIGN PATENT DOCUMENTS

| | | | |
|---|---|---|---|
| JP | 06-302000 | | 10/1994 |
| JP | 8-287499 | A | 11/1996 |
| JP | 08287499 | A * | 11/1996 |
| JP | 10-177733 | A | 6/1998 |
| JP | 11-339291 | | 12/1999 |
| JP | 2000-057602 | | 2/2000 |
| JP | 2000-099968 | | 4/2000 |

OTHER PUBLICATIONS

Foreign Office Action with mail date Dec. 11, 2007 for Patent Application No. 2003-174348 with English Translation.

* cited by examiner

*Primary Examiner*—Tianjie Chen
(74) *Attorney, Agent, or Firm*—McDermott Will & Emery LLP

(57) ABSTRACT

An optical head includes a fixed part, a movable part movably held by a plurality of wires fixed on the fixed part, and magnets fixed to the fixed part. The movable part includes a movable-part housing, a heatsink held by the movable-part housing, a light emitting element and a light receiving element both mounted on the heatsink, magnets provided to both sides of the movable-part housing to contact the heatsink, an objective lens held by the movable-part housing to allow an emitted laser beam from the light emitting element to focus, and a diffraction grating provided between the objective lens and the light emitting element and between the objective lens and the light receiving element. The gap between each coil and the adjacent magnet is filled with ferrofluid having a higher thermal conductivity than the atmosphere.

4 Claims, 8 Drawing Sheets

| Reference Numeral | Name | Material | Thermal Conductivity |
|---|---|---|---|
| 1 | Heat Sink | Cu | 400 W/K/m |
| 4 | Magnet | Fe Alloy | 50 W/K/m |
| 6 | — | Ferrofluid | 0.15 W/K/m |
| 5 | Coil | Cu | 400 W/K/m |
| 7 | Yoke | Fe Alloy | 50 W/K/m |
| 8 | Fixed Part | Al Alloy | 140 W/K/m |
| — | — | Atmosphere | 0.03 W/K/m |
| 20 | Movable-Part Housing | Plastic | 0.3 W/K/m |

OPTICAL HEAD

CROSS-REFERENCE TO RELATED APPLICATIONS

This application claims priority under 35 U.S.C. §119(a) on Japanese Patent Application No. 2003-174348, the entire contents of which are hereby incorporated by reference.

BACKGROUND OF THE INVENTION (1) Field of the Invention

The present invention relates to an optical head comprising a light emitting element such as a laser diode, for example, an optical head for reading data recorded on an optical recording medium such as a CD or a DVD and recording data on an optical recording medium.

(2) Description of Related Art

In recent years, information technology devices utilizing light emitting elements such as laser diodes have advanced remarkably. Such information technology devices include optical disk drives capable of recording data on an optical disk by laser light and reading the recorded data therefrom. An optical head is an extremely important component of such an optical disk drive, because its performance determines that of the optical disk drive. In order to realize high-speed recording and cost reduction of the optical disk drives, various attempts have been made. In the optical disk drive, the optical head records data by modulating laser light and applying the modulated laser light to an optical disk, detects return light from an optical disk to which laser light is applied and thereby converts data recorded on the optical disk into electrical signals.

An optical system of a conventional optical head is composed of a light emitting element (for example, a semiconductor laser diode), a light receiving element (for example, photodiode), an objective lens, a collimator lens, a diffraction grating, and so on. In the conventional optical head of such a structure, the following technique is typically employed (see Japanese Unexamined Patent Publication No. 10-177733). Only a lens holding means holding the objective lens is allowed to follow an optical disk, an emitted laser beam from the light emitting element is focused on a predetermined site of the recording surface of the optical disk, and the reflected beam from the recording surface is then guided to the light receiving element by the diffraction grating. However, this technique principally has the following two problems. The first problem is that the movement of the objective lens causes a difference between the principal ray of the emitted laser beam and the optical axis of the objective lens, leading to coma aberration. The second problem is that since the optical components are arranged separately into a component in the lens holding means that can follow the optical disk and components in a fixed part that does not follow the optical disk, the number of optical components increases, leading to difficulty in downsizing the optical head.

To cope with these problems, for example, there is suggested an optical head structure in which a an objective lens, a light emitting element and a light receiving element are mounted in the same housing and are made together movable in the focusing and tracking directions (see, for example, Japanese Unexamined Patent Publication No. 8-287499). Such an optical head in which a light emitting element and a light receiving element are mounted in the same housing and which has a mechanism that drives them together in the focusing and tracking directions is hereinafter referred to as an "optical-system-integrated optical head". According to the structure of the optical-system-integrated optical head, the positional relationship among the objective lens, the light emitting element and the light receiving element does not change at all during tracking and focusing motions. This can prevent the above-mentioned coma aberration from occurring and reduce the number of optical components.

FIG. 9 is a cross-sectional view showing the structure of the conventional integrated (optical head. As shown in this figure, the conventional optical head 1000 comprises a lens holding means (housing) 1010, and the lens holding means 1010 and a heatsink (radiating plate) 1011 are integrally molded. Furthermore, the lens holding means 1010 is mounted internally with a light emitting element 1001, a light receiving element 1002, a diffraction grating 1003, a quarter-wave plate 1004, a reflecting mirror 1005, and an objective lens 1006. The light emitting element 1001 and the light receiving element 1002 are mounted on the heatsink 1011. The lens holding means 1010 is mounted externally with a movable-part-driving coil (magnetic circuit) 1007, which is fixed in an optical disk drive by an elastic supporting member (not shown). The movable-part-driving coil 1007 allows a slight movement of a moveable part which consists of the lens holding means 1010 and so on (hereinafter, referred to as an "actuator motion").

An emitted laser beam from the light emitting element 1001 in the horizontal direction (the lateral direction in FIG. 9) passes through the diffraction grating 1003 and the quarter-wave plate 1004 and thereafter is reflected by the reflecting mirror 1005 in the generally vertical direction (the upright direction in FIG. 9). The emitted laser beam reflected by the reflecting mirror 1005 is focused on a predetermined site of an optical disk 1050. The focused emitted laser beam is reflected as a laser beam having an intensity distribution corresponding to recording/site information on the optical disk 1050. This reflected laser beam again passes through the objective lens 1006 and is then reflected by the reflecting mirror 1005. The laser beam reflected by the reflecting mirror 1005 passes through the quarter-wave plate 1004. Thereafter, it is diffracted and guided to the light receiving element 1002 by the diffraction grating 1003. The intensity distribution of the reflected laser beam is detected by the light receiving element 1002 and then converted into electrical signals by a photoelectric conversion device or the like. An arithmetic circuit (not shown) calculates a tracking error signal and a focus error signal based on these electrical signals. A predetermined power variation is applied to the movable-part-driving coil 1007 based on these error signals, thereby causing electromagnetic action. In this way, the lens holding means 1010 can be moved such that the emitted laser beam is always focused on a predetermined site of the optical disk 1050. Furthermore, the optical disk drive reads data recorded in the optical disk 1050 by detecting the intensity of the reflected laser beam from a predetermined site on the optical disk 1050. The intensity distribution is detected by the light receiving element 1002.

On the other hand, a large amount of Joule heat is produced during the actuation of the light emitting element 1001 and the light receiving element 1002. This Joule heat degrades the characteristics of the light emitting element 1001 and the light receiving element 1002 themselves. Therefore, in the optical head, a heat dissipating structure must be formed in the movable part to dissipate the produced heat. Thus, in the conventional optical-system-integrated optical head, the light emitting element 1001 and the light receiving element 1002 are mounted on the heatsink 1011 and a contact area between the heatsink 1011 and the atmosphere is increased. In this manner, heat generated in the light emitting element 1001 and the light receiving element 1002 is released into the atmosphere.

SUMMARY OF THE INVENTION

In recent years, increase in capability of optical heads, such as the increase in rates of reading/writing operations, has been advanced. With this advancement, the beam power of light emitting elements and the detection rate of light receiving elements have been increasing. As a result, power consumption in light emitting elements and light receiving elements has drastically been increasing and thus calorific value has drastically been increasing. When the accumulation of generated heat increases the temperature of a light emitting element, this causes decrease in power of a laser beam or malfunction of an arithmetic circuit. To cope with this, attempts have actively been made to decrease power consumption by increasing the efficiencies of light emitting elements and light receiving elements. However, since the decrease in power consumption has a limit, attention has also been directed to improving the heat dissipating structure to increase heat dissipating efficiency. For example, it is considered that in the conventional optical-system-integrated optical head 1000 shown in FIG. 9, the contact area between the heatsink 1011 and the atmosphere is to be increased. However, in the structure of the conventional optical head 1000, in order to sufficiently dissipate heat generated in a light emitting element and a light receiving element into the atmosphere having a very low thermal conductivity of about 0.03 W/K/m, the heatsink 1011 need be larger to increase its surface area. Thus, the weight of a movable part will be increased. This makes it difficult to effectively move the optical-system-integrated optical head 1000 using the movable-part-driving coil 1007, and thus the optical head 1000 may be degraded in its characteristic of the actuator motion.

In view of the above problem, an object of the present invention is to provide an optical head that effectively dissipates heat generated in a light emitting element and a light receiving element both mounted to a movable part and restrains the actuator motion of the movable part from being degraded.

An optical head of the present invention comprises: a fixed part; a movable part including a light emitting element, an objective lens and a light receiving element; and a heat dissipating medium placed between a side surface of the movable part and the fixed part.

With this structure, heat generated in the light emitting element and the light receiving element can partly be transferred from the movable part through the heat dissipating medium to the fixed part. Therefore, heat can efficiently be dissipated and malfunction due to the heat can be suppressed.

The heat dissipating medium is preferably held between the side surface of the movable part and the fixed part by a magnetic field. This can ensure the holding of the heat dissipating medium.

The heat dissipating medium is preferably ferrofluid. This prevents the actuator motion of the movable part from being interfered with and allows unnecessary vibration of the movable part to be absorbed.

The movable part further comprises a heatsink. Therefore, Joule heat generated in the light emitting element and the light receiving element can be more effectively dissipated. Furthermore, since heat of the movable part can effectively be dissipated through the heat dissipating medium, the area of the heatsink can be reduced as compared with the conventional optical head. Therefore, the actuator motion of the movable part is not interfered with in spite of the achievement of a high dissipating efficiency.

The optical head further comprises: a yoke provided as a part of the fixed part; a coil wound around the yoke; and a magnet contacting the heatsink and spaced apart from the coil, wherein the heat dissipating medium is placed between the magnet and the coil. Therefore, the heat generated in the light emitting element and the light receiving element is transferred through the heatsink, the magnet, the heat dissipating medium, the coil, and the yoke in this order to the fixed part. This allows the heat to be efficiently dissipated from the movable part to the fixed part.

The optical head further comprises: a magnet provided as a part of the fixed part; and a coil contacting the heatsink and spaced apart from the magnet, wherein the heat dissipating medium is placed between the magnet and the coil. Therefore, the heat generated in the light emitting element and the light receiving element is transferred through the heatsink, the coil and yoke, the heat dissipating medium, and the magnet in this order to the fixed part. This allows the heat to be efficiently dissipated from the movable part to the fixed part.

The coil may be wound around a yoke.

The heat dissipating medium may also be placed between the coil and the yoke.

DETAILED DESCRIPTION OF THE INVENTION

Figure 1:
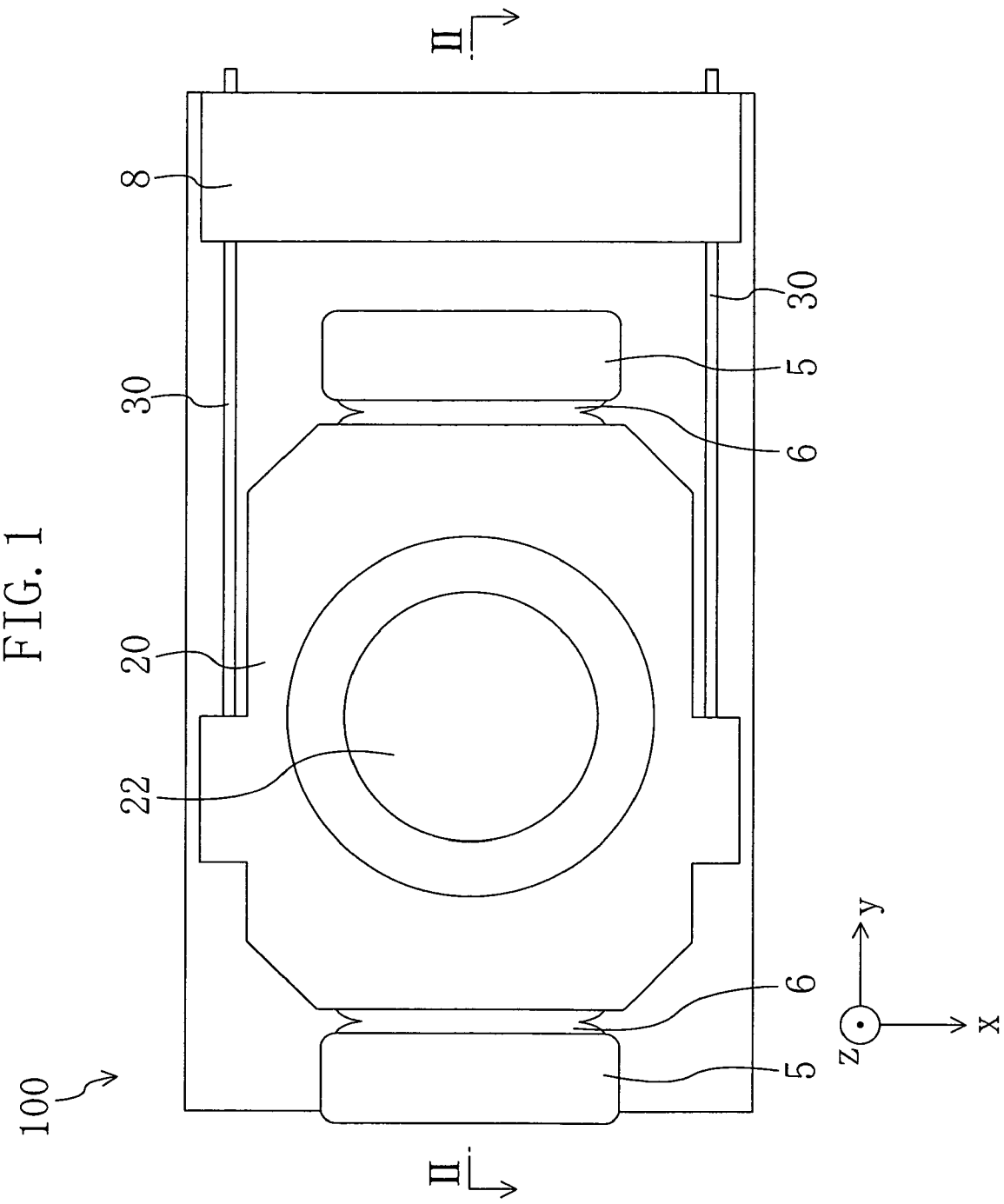
FIG. 1 is a plan view showing an optical head according to a first embodiment of the present invention when viewed from above.

The preferred embodiments of the present invention will be described below with reference to the drawings. For the sake of simplicity, common components among embodiments are denoted by the same reference numerals.

Embodiment 1

Figures 2, 3:
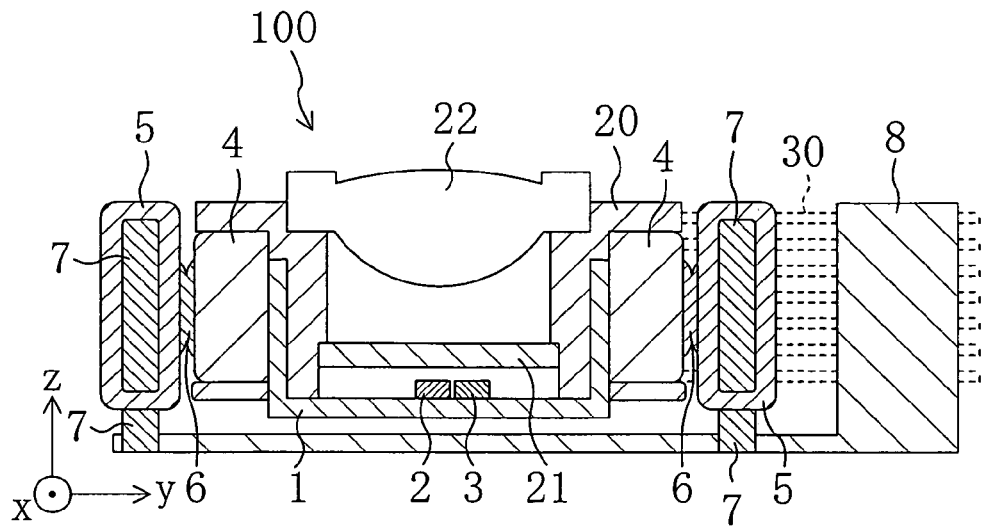
FIG. 2 is a cross sectional view of the optical head according to the first embodiment taken along the line II-II shown in FIG. 1.
FIG. 3 is a table showing thermal conductivities of materials of which components of the optical head of the present invention are made, respectively.

FIG. 1 is a plan view showing an optical head according to a first embodiment of the present invention when viewed from above. FIG. 2 is a cross sectional view of the optical head according to the first embodiment taken along the line II-II shown in FIG. 1. In FIG. 2, the x direction means the depth direction of the paper, the y direction means a side-to-side direction, i.e., the direction along which wires 30 extend, and the z direction means a vertical direction, i.e., the direction parallel to the optical axis of an objective lens 22.

As shown in FIGS. 1 and 2, an optical head 100 of this embodiment comprises a fixed part 8 fixed on an optical base (not shown) and a movable part. The optical head 100 of this embodiment is characterized by placing a heat dissipating medium between side surfaces of the movable part and the fixed part 8.

The movable part comprises a movable-part housing (lens holding means) 20, a heatsink 1 of a good thermal conductor (such as copper) held by the movable-part housing 20, a light emitting element 2, a light receiving element 3, magnets 4, an objective lens 22 for allowing an emitted laser beam from the light emitting element 2 to focus, and a diffraction grating (holographic optical element) 21. The light emitting element 2 is mounted on the heatsink 1 and emits a laser beam. The light receiving element 3 is mounted on the heatsink 1 and detects an incident laser beam. The magnets 4 are placed on both sides of the movable-part housing 20 to contact the heatsink 1. The objective lens 22 is held by the movable-part housing 20. The diffraction grating 21 is placed between the objective lens 22 and both the light emitting element 2 and light receiving element 3 in the movable-part housing 20. The movable part is connected to the fixed part 8 through a plurality of wires 30 made of an elastic material and placed to both sides of the movable part, and held movably in the x and y directions by the wires 30. In an example shown in FIG. 2, the heatsink 1 has side and bottom portions that cover the outside surfaces of the movable-part housing 20. The lower surface of the bottom portion is exposed as the bottom surface of the movable part. For example, copper (Cu) or the like having a high thermal conductivity is used as the material of the heatsink 1. For example, an alloy of iron, more specifically, $Nd_2.Fe_{14}.B$, $BaO.6Fe_2O_3$ or the like, is used as the material of the magnet 4 (see FIG. 3).

On the other hand, the fixed part 8 includes yokes 7 fixed thereto and formed of a magnetic substance such as iron or an alloy of iron (4Si+Fe or the like), and a coil 5 is wound around each yoke 7. For example, two coils 5 are provided, each of which is located a predetermined distance apart from either one of magnets 4 in the vicinity of the magnet 4. In this case, the distance between the magnet 4 and the coil 5 is, for example, 0.1 mm through 0.2 mm both inclusive. The gap between the coil 5 and the magnet 4 is filled with a heat dissipating medium, such as ferrofluid 6, held by a magnetic field generated between the magnet 4 and the yoke 7. In this embodiment, the ferrofluid 6 is a liquid which is based on a lipophilic and viscous liquid into which ferromagnetic ultrafine particles such as $Fe_3O_4$ is stably diffused at a high concentration and has a higher thermal conductivity than the atmosphere. In particular, in order to make enough use of the performance of the optical head, there is preferably used a ferrofluid having four or more times as high a thermal conductivity as the atmosphere.

Next, the operation of the optical head of this embodiment will be described.

First, emitted light, such as a laser beam, from the light emitting element 2 passes through the diffraction grating 21 and is focused on the recording surface of an unshown optical disk by the objective lens 22. The light focused on the recording surface of the optical disk is reflected thereon, and the reflected light has a light distribution reflecting the recording/site information on the recording surface and is again guided to the diffraction grating 21 by the objective lens 22. Part of the reflected light guided to the diffraction grating 21 provides diffraction light and is guided to the light receiving element 3 and converted into electrical signals therein. The site information converted into electrical signals in the light receiving element 3 is calculated by an unshown external circuit to obtain servo signals. These servo signals are applied to the coils 5 and controls the movable part in the x and z directions by an electromagnetic force such that the emitted laser beam is focused on a proper site of the optical disk. When the wires 30 are made of a conductive material, the wires 30 can serve as power supply lines to the light emitting element 2 and the light receiving element 3. In addition, the wires 30 can serve as signal lines from the light receiving element 3.

During the above-mentioned operation, most of Joule heat generated in the light emitting element 2 and the light receiving element 3 is transferred to the heatsink 1 and thereafter transferred through the magnets 4, the ferrofluids 6, the coils 5, and the yokes 7 in this order to the fixed part 8. As a result, the Joule heat is dissipated to the outside of the movable part. At this time, the ferrofluids 6 do not interrupt with a slight movement of the movable part and do not exert an influence upon the directions of the magnetic fields generated in the gaps between the magnets 4 and the associated yokes 7. Thus, they do not adversely affect the actuator motion of the movable part. Since the movable part moves only in the x and z directions, the distances between the magnets 4 and the adjacent coils 5 do not vary and thus are always fixed. Therefore, the length of a thermal conduction path (in this embodiment, the ferrofluid) to which Joule heat is conducted during the movement of the movable part does not vary and thus the heat dissipation characteristics of the optical head 100 are stable.

FIG. 3 is a table showing exemplary thermal conductivities of materials of which the components of the optical head according to the present invention are made, respectively. It is seen from this figure that the ferrofluid 6 exhibits four or more times as high a thermal conductivity as the atmosphere. It is also seen therefrom that the heatsink 1, the magnets 4, the coils 5, the yokes 7, and the fixed part 8 all constituting a thermal conduction path are composed of metals with relatively high thermal conductivities and heat generated in the movable part is efficiently transferred to the fixed part 8. In the optical head 100 of this embodiment, the heatsink 1 and the coils 5 each composed of copper have a thermal conductivity of 400 W/K/m and the magnets 4 and the yokes 7 each composed of an Fe alloy have a thermal conductivity of 50 W/K/m. The fixed part 8 composed of an Al alloy (for example, A5052) has a thermal conductivity of 140 W/K/m.

As described above, in the optical head 100 of this embodiment, Joule heat generated in the light emitting element 2 and the light receiving element 3 can be transferred, in paths leading to the ferrofluids 6, through high-thermal-conductivity members other than the movable-part housing 20 composed of a plastic with a small thermal conductivity of 0.3 W/K/m. The Joule heat that has reached the ferrofluids 6 passes through the ferrofluids 6 each having a higher thermal conductivity than the atmosphere and is transferred via the coils 5 and the yokes 7 to the fixed part 8. Therefore, it is more efficiently released to the atmosphere than in the use of the conventional optical head. Furthermore, the distances between the magnets 4 and the adjacent coils 5 each can be reduced, for example, to 0.1 mm through 0.2 mm both inclusive. This allows heat to be efficiently transferred using the ferrofluids 6 each having a thermal conductivity higher than the atmosphere but lower than a solid.

Accordingly, in the optical head 100 of this embodiment, the temperature of the movable part can be prevented from excessively increasing. Especially in the optical head 100 of this embodiment, the use of a material having a higher thermal conductivity than the atmosphere as the ferrofluid 6 can ensure a sufficient heat dissipation effect even if the heatsink 1 has a smaller area than the conventional one. In addition, this makes it impossible to interfere with the actuator motion of the movable part.

In the optical head of this embodiment, the example in which the ferrofluid is used as a heat dissipating medium is given. However, other materials may be utilized instead as long as the materials have a higher thermal conductivity than the atmosphere and do not interfere with the movement of the movable part. For example, an elastic body such as a spring, mercury, or a liquid crystal can be used as a heat dissipating medium. However, it is most preferable to use the ferrofluid as a heat dissipating medium, because the ferrofluid can absorb the unnecessary vibration of the movable part for reason of its viscosity, a magnetic field prevents it from being released, and the influence on the movement of the movable part is extremely small.

Embodiment 2

Figure 4:
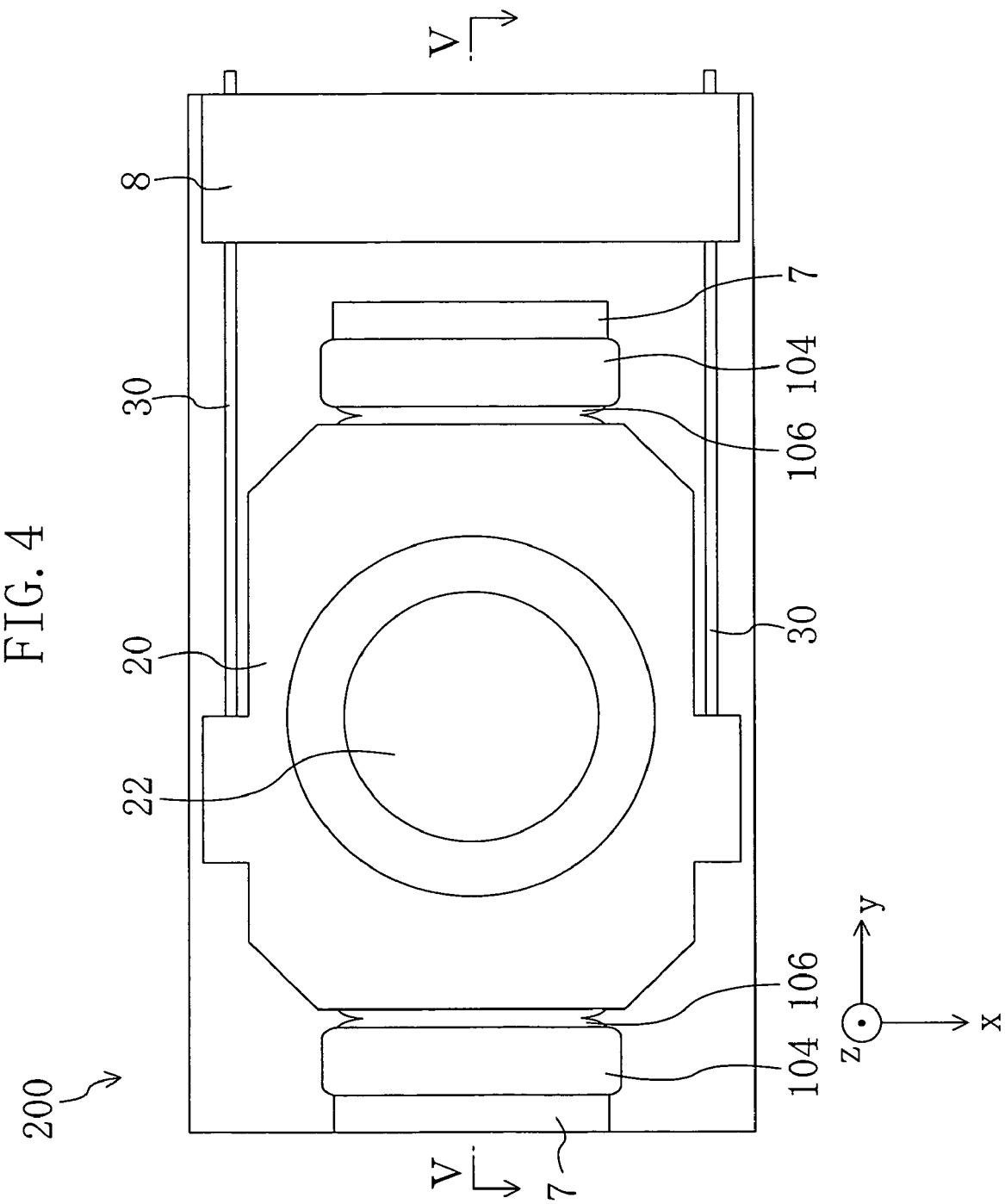
FIG. 4 is a plan view showing an optical head according to a second embodiment of the present invention when viewed from above.
Figure 5:
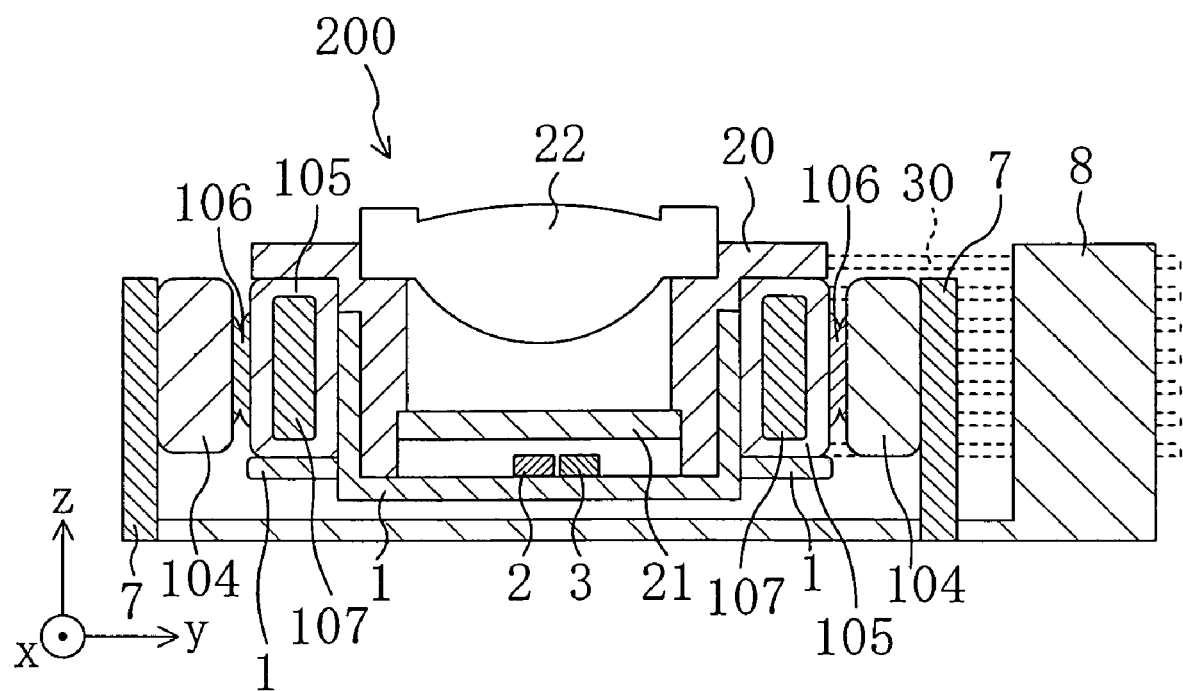
FIG. 5 is a cross sectional view of the optical head according to the second embodiment taken along the line V-V shown in FIG. 4.

FIG. 4 is a plan view showing an optical head according to a second embodiment of the present invention when viewed from above, and FIG. 5 is a cross sectional view of the optical head according to the second embodiment taken along the line V-V shown in FIG. 4. The optical head of this embodiment has the same structure as that of the first embodiment except in some points. Therefore, different points from the optical head of the first embodiment will principally be described below.

As shown in FIGS. 4 and 5, a movable part of an optical head 200 comprises a movable-part housing 20, a heatsink 1, a light emitting element 2, a light receiving element 3, a diffraction grating 21, an objective lens 22, coils 105, and yokes 107. Each coil 105 is wound around the associated yoke 107 formed of a magnetic substance and placed a predetermined distance apart from an associated one of yokes 7 fixed to a fixed part 8. A magnet 104 is fixed to the surface of each yoke 7 directed to the movable part. The coil 105 and magnet 104 are placed a predetermined distance apart from each other and in the vicinity of each other. Ferrofluid 106 is placed in the gap between each magnet 104 and the coil 105 and held by the magnetic field generated between the magnet 104 and the yoke 107. A material having a higher thermal conductivity than the atmosphere is preferably used as the ferrofluid 106, and a material having four or more times as high a thermal conductivity as the atmosphere is more preferably used thereas. The distance between the coil 105 and the magnet 104 is 0.1 mm through 0.2 mm both inclusive as in the first embodiment.

With this structure, most of Joule heat generated in the light emitting element 2 and the light receiving element 3 is conducted to the heatsink 1, and thereafter transferred through the coils 105, the yokes 107, the coils 105 (parts of the coils 105 located closer to the magnets 104), the ferrofluids 106, and the magnets 104 in this order to the fixed part. As a result, the Joule heat is dissipated to the outside of the movable part. At this time, the ferrofluids 106 do not interfere with a slight movement of the movable part and do not exert an influence upon the directions of the magnetic fields generated in the gaps between the magnets 104 and the associated yokes 107. Thus, they do not adversely affect the actuator motion of the movable part. Since the movable part moves only in the x and z directions during the slight movement thereof, the distances between the magnets 104 and the adjacent coils 105 do not vary. Therefore, the length of a thermal conduction path to which Joule heat is conducted during the movement of the movable part does not vary and thus the heat dissipation characteristics of the optical head 200 are stable.

As described above, even when the movable part is provided with yokes and coils and the fixed part is provided with magnets, Joule heat generated in the light emitting element 2 and the light receiving element 3 can be efficiently dissipated without preventing the actuator motion of the movable part. Since in particular the optical head 200 of this embodiment has a higher heat dissipation efficiency than the conventional one, it can ensure a sufficient heat dissipation effect, like that of the first embodiment, even if the area of the heatsink 1 is reduced.

When the wires 30 are made of a conductive material, the wires 30 can serve as power supply lines to the light emitting element 2, the light receiving element 3 and the coils 105. In addition, the wires 30 can serve as signal lines from the light receiving element 3.

Embodiment 3

Figure 6:
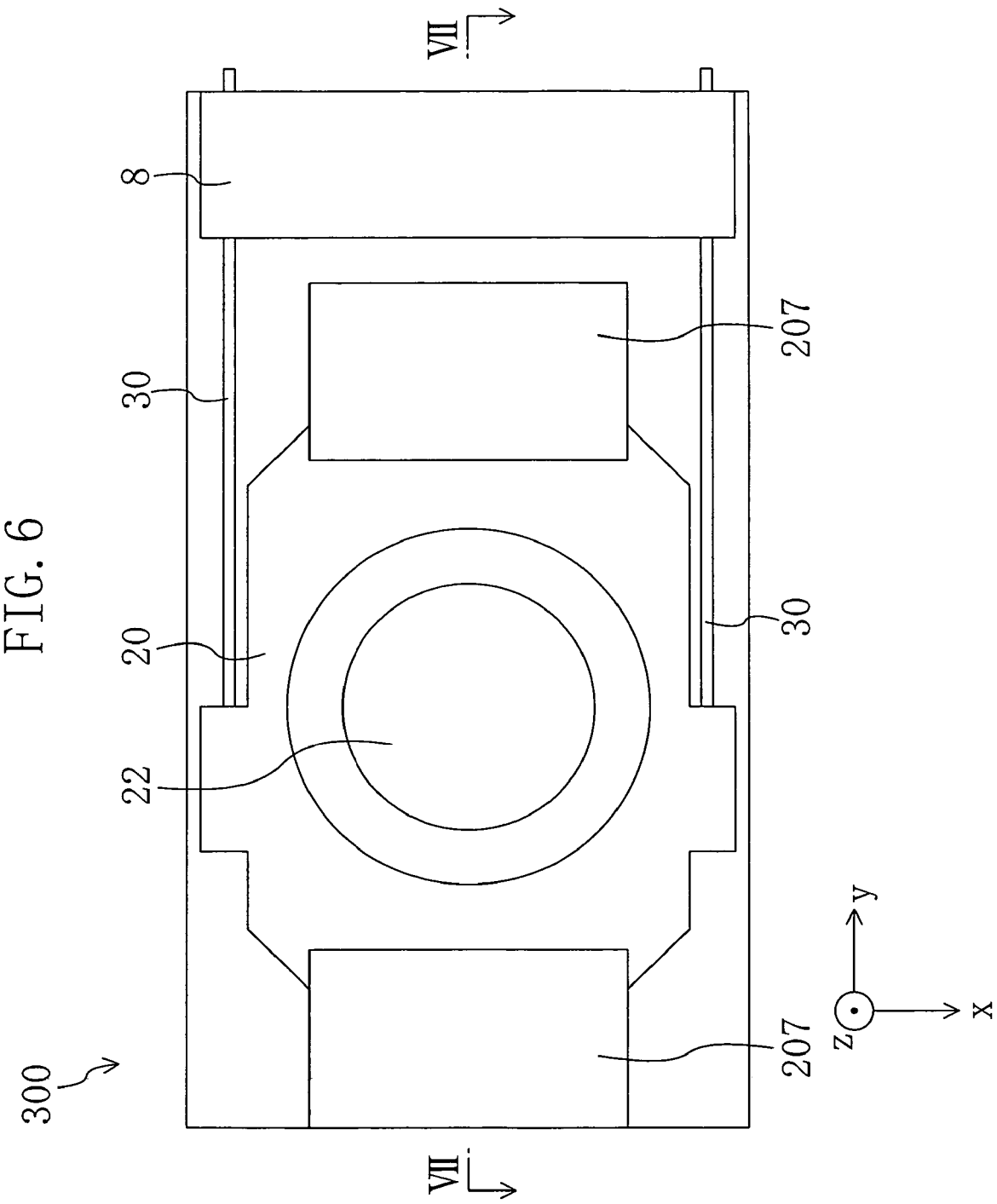
FIG. 6 is a plan view showing an optical head according to a third embodiment of the present invention when viewed from above.
Figure 7:
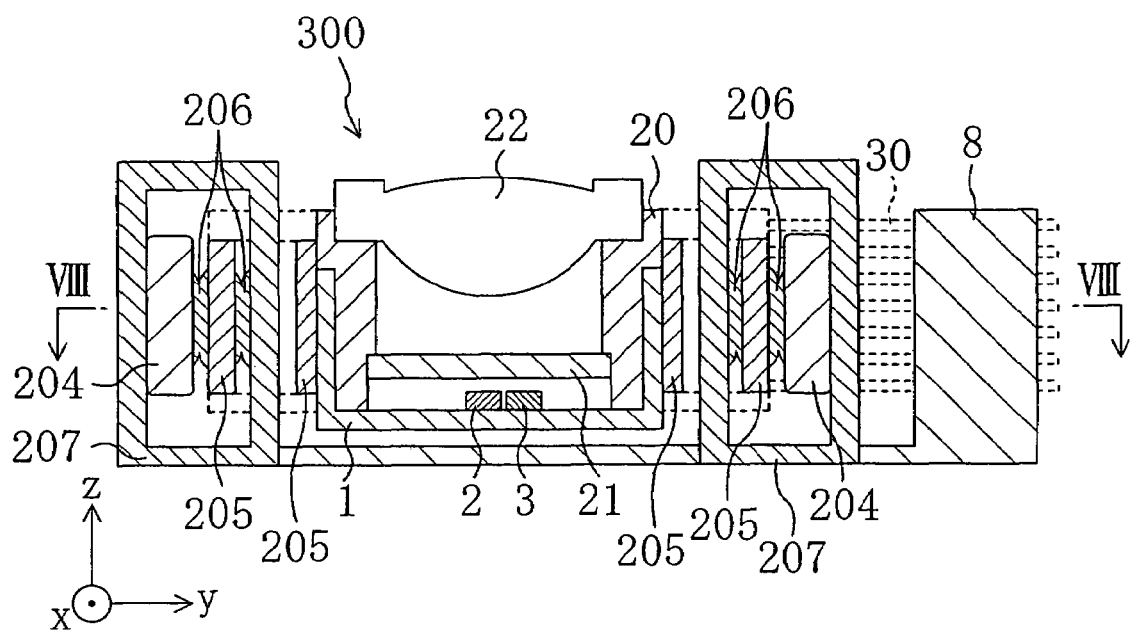
FIG. 7 is a cross sectional view of the optical head according to the third embodiment of the present invention taken along the line VII-VII shown in FIG. 6.
Figure 8:
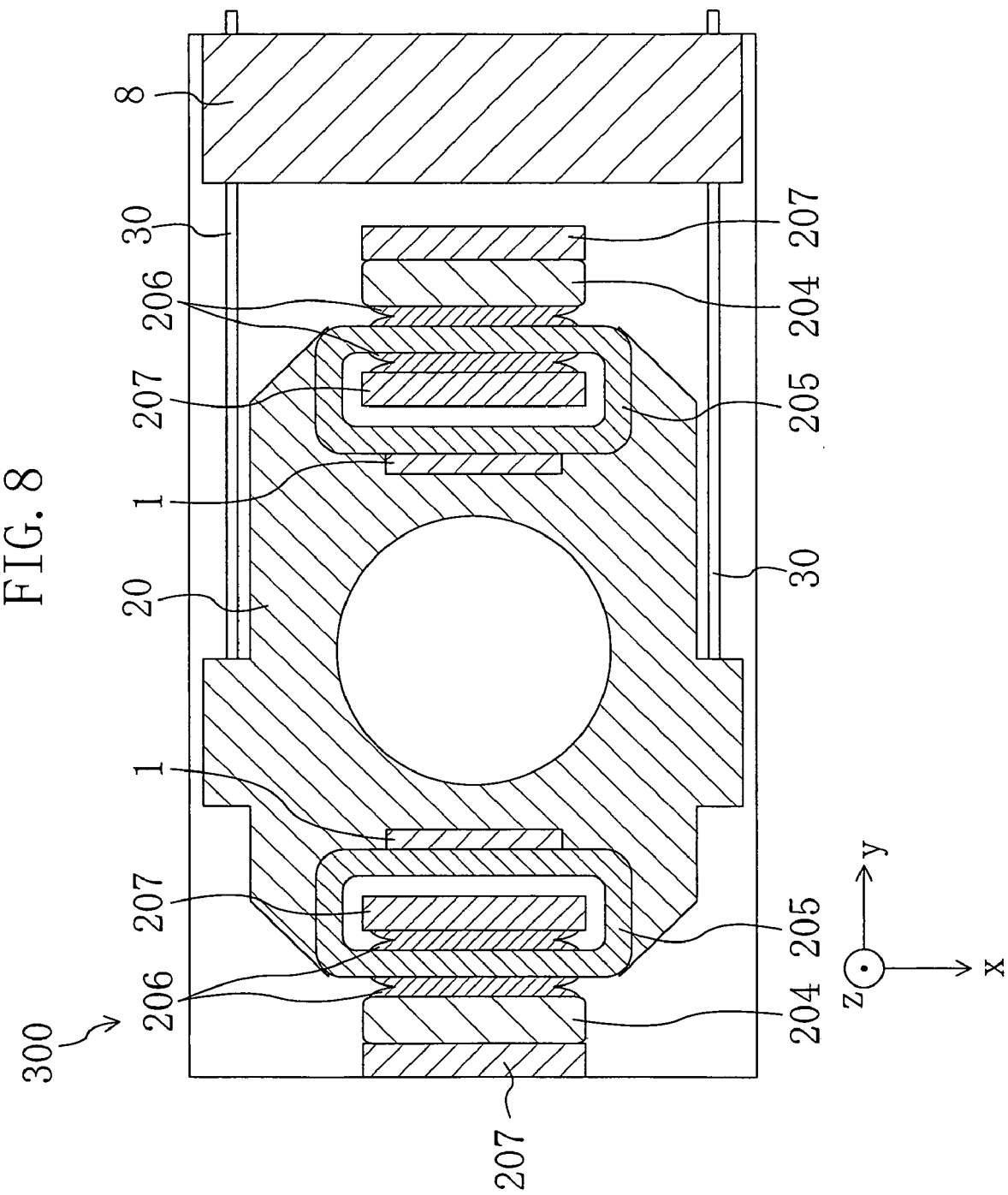
FIG. 8 is a cross sectional view of the optical head according to the third embodiment taken along the line VIII-VIII shown in FIG. 7.
Figure 9:
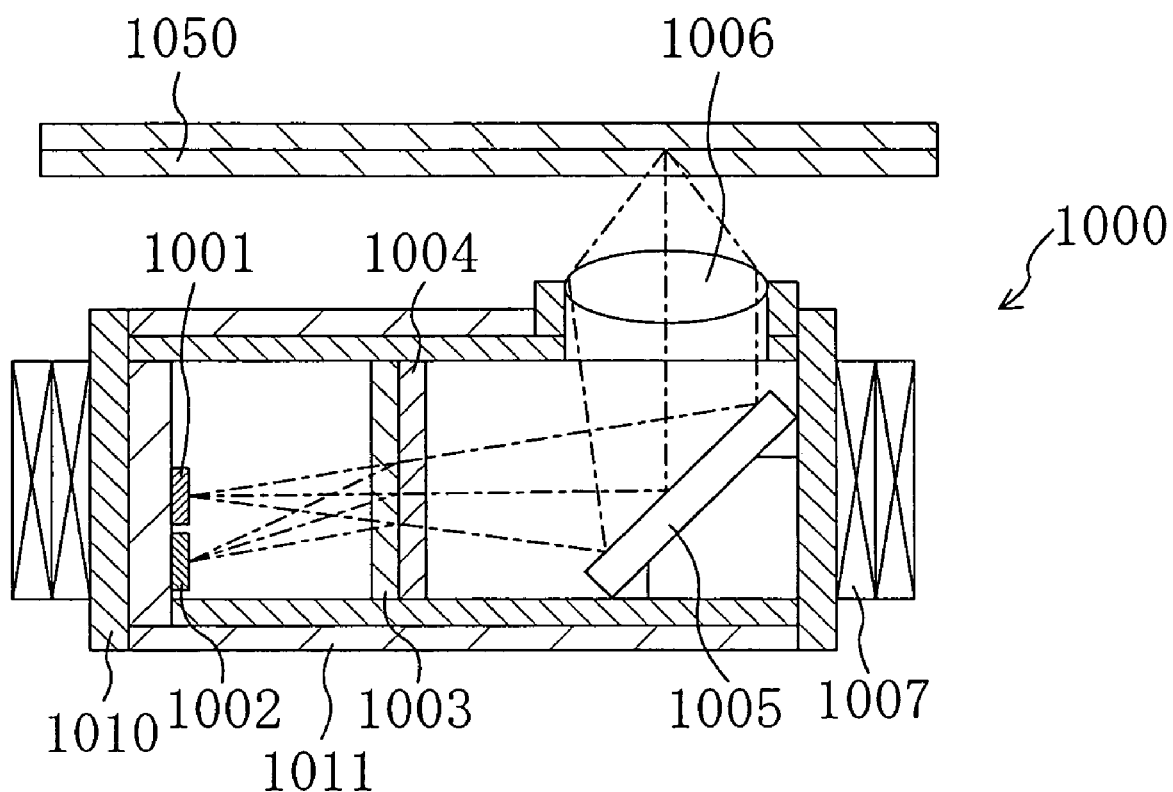
FIG. 9 is a cross sectional view showing the structure of a conventional integrated optical head.

FIG. 6 is a plan view showing an optical head according to a third embodiment of the present invention when viewed from above, and FIG. 7 is a cross sectional view of the optical head according to the third embodiment of the present invention taken along the line VII-VII shown in FIG. 6. FIG. 8 is a cross sectional view of the optical head according to the third embodiment taken along the line VIII-VIII shown in FIG. 7. The optical head of this embodiment has the same structure as that of the first embodiment except in some points. Therefore, different points from the optical head of the first embodiment will principally be described below.

As shown in FIGS. 6 through 8, a movable part of an optical head 300 comprises a movable-part housing 20, a heatsink 1, a light emitting element 2, a light receiving element 3, a diffraction grating 21, an objective lens 22, and coils 205. Fixed to a fixed part 8 are yokes 207 to which magnets 204 are fixed, respectively, and each of which is held to have a predetermined distance from the associated coil 205. Each yoke 207 is made of a magnetic substance and in this example have a hollow structure. Each magnet 204 is fixed in the vicinity of the associated coil 205 and spaced apart from the coil 205. Ferrofluids 206 are placed in the gap between each magnet 204 and the adjacent coil 205 and the gap between the coil 205 and the associated yoke 207, respectively, and held by the magnetic field generated between the magnet 204 and the yoke 207. A material having a higher thermal conductivity than the atmosphere is preferably used as the ferrofluid 206, and a material having four or more times as high a thermal conductivity as the atmosphere is more preferably used thereas. In the optical head 300 of this embodiment, the coils 205 surrounded around the yokes 207 contact the heatsink 1.

This structure makes it possible to conduct most of Joule heat generated in the light emitting element 2 and the light receiving element 3 to the heatsink 1, the coils 205, the ferrofluids 206, the magnets 204, and the fixed part 8, thereby releasing the heat to the outside of the movable part. This allows heat generated in the movable part to be more efficiently dissipated than in the use of the conventional optical head. As a result, the actuator motion of the movable part is not interfered with. In this way, in the optical head of this embodiment, the temperature of the movable part can be restrained from excessively increasing, resulting in the reduced occurrence of malfunctions. Therefore, the use of the optical head of this embodiment provides CDs and DVDs with high operating reliability.

What is claimed is:

1. An optical head comprising:
a fixed part;
a movable part including a light emitting element, an objective lens, a light receiving element and a heatsink;
a heat dissipating medium placed between a side surface of the movable part and the fixed part;
a magnet provided as a part of the fixed part; and
a coil contacting the heatsink and spaced apart from the magnet,
wherein the heat dissipating medium is held between the side surface of the movable part and the fixed part by a magnetic field, and
the heat dissipating medium is placed between the magnet and the coil.

2. The optical head of claim 1, wherein
the heat dissipating medium is ferrofluid.

3. The optical head of claim 1, wherein
the coil is wound around a yoke.

4. The optical head of claim 3, wherein
the heat dissipating medium is placed between the coil and the yoke.

* * * * *